No. 798,159. PATENTED AUG. 29, 1905.
T. BRENNAN, Jr.
PRESSER WHEEL ATTACHMENT FOR DRILLS.
APPLICATION FILED MAY 16, 1904.

2 SHEETS—SHEET 1.

Witnesses.
E. W. Jeppesen.
A. H. Opsahl.

Inventor:
Thomas Brennan Jr.
By his Attorneys.
Williamson Merchant

UNITED STATES PATENT OFFICE.

THOMAS BRENNAN, JR., OF ST. LOUIS PARK, MINNESOTA.

PRESSER-WHEEL ATTACHMENT FOR DRILLS.

No. 798,159. Specification of Letters Patent. Patented Aug. 29, 1905.

Application filed May 16, 1904. Serial No. 208,147.

*To all whom it may concern:*

Be it known that I, THOMAS BRENNAN, Jr., a citizen of the United States, residing at St. Louis Park, in the county of Hennepin and State of Minnesota, have invented certain new and useful Improvements in Presser-Wheel Attachments for Drills; and I do hereby declare the following to be a full, clear, and exact description of the invention, such as will enable others skilled in the art to which it appertains to make and use the same.

My invention relates particularly to disk drills, and has for its especial object to provide an improved presser-wheel attachment therefor.

To the above ends the invention consists of the novel devices and combinations of devices hereinafter described, and defined in the claims.

The invention is illustrated in the accompanying drawings, wherein like characters indicate like parts throughout the several views.

Figure 1:
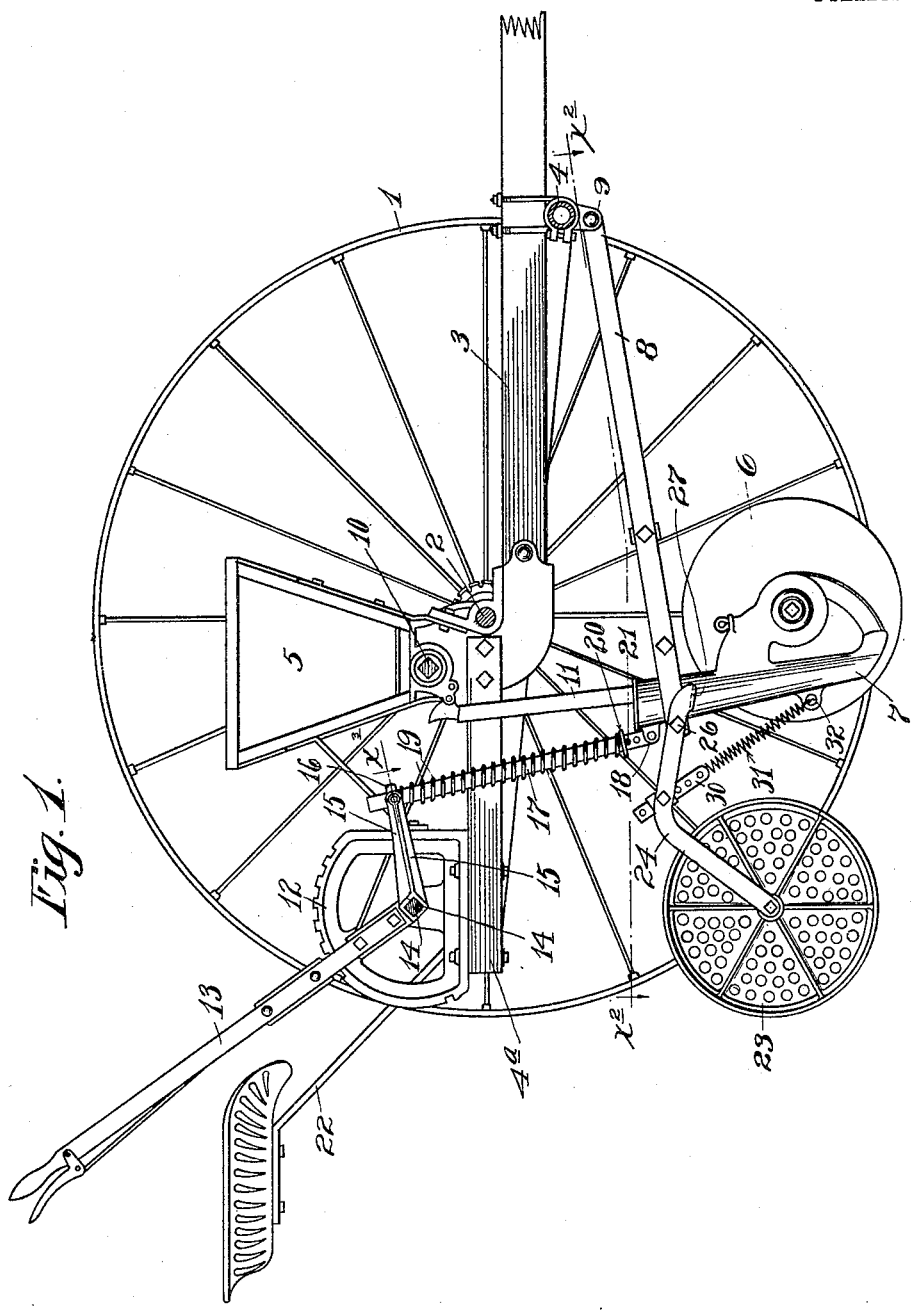
Figure 2:
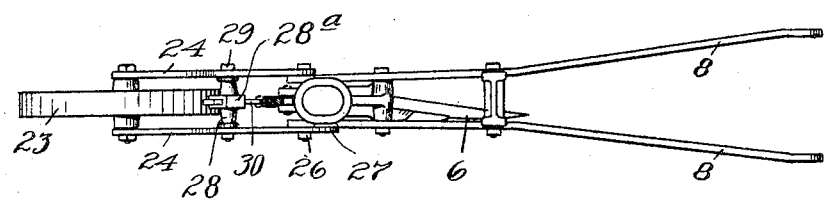
Figure 3:
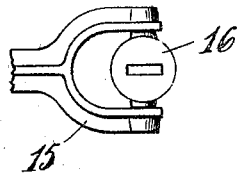

Figure 1 is a view in vertical section, taken from front to rear through a machine having my invention applied thereto. Fig. 2 is a horizontal section on the line $x^2 x^2$ of Fig. 1, showing in detail one seed-boot, one drag-bar, one disk, and one of the coöperating presser-wheel attachments; and Fig. 3 is a detail in horizontal section on the line $x^3 x^3$ of Fig. 1.

The numeral 1 indicates one of the wheels, the numeral 2 the axle, the numeral 3 the pole, the numeral 4 the frame, and the numeral 5 the seed-hopper, of the seeding-machine, which parts may be of the usual or any suitable construction.

The furrow-opening disks 6 are journaled to seed-boots 7, which in turn are rigidly secured to the rear ends of drag-bars 8, the forward ends of which drag-bars are pivotally attached at 9 to depending lugs on the transverse forward portion of the frame 4. In the drawings only one disk, one seed-boot, and one drag-bar are shown; but it will of course be understood that in the machine these devices are duplicated and arranged side by side.

For each seed-boot 7 there is a feed device 10 of the usual or any suitable construction arranged to work in the bottom of the seed-hopper 5 and to deliver the seed to the corresponding seed-boot 7 through a depending feed-spout 11.

Rigidly secured to a rearwardly-projecting beam $4^a$ of the frame 4 is a latch-arch 12, to which is pivoted a latch-lever 13. This latch-lever 13 is rigidly secured to a transverse rock-shaft 14, suitably mounted on the framework of the machine. This rock-shaft 14, as is usual, is provided with a plurality of projecting arms 15, only one of which is shown in the drawings. The outer end of each arm 15 is shown as pronged and as carrying a pivoted head 16, through which works the upper end of a lifting-rod 17, the lower end of which is pivotally attached at 18 to a rearwardly-projecting lug on the upper end of the seed-boot 7. A coiled spring 19 is placed on the rod 17 and is compressed between the head 16 and a washer 20, placed on the lower end of said rod 17 and anchored thereto by a pin 21. The numeral 22 indicates the driver's seat, which is supported from the frame 4 in the usual or any suitable way.

The construction so far described is a standard construction or such as is found in quite a number of different machines of this general character.

In applying my invention I journal the presser-wheel or covering-wheels 23 in the rear ends of a pair of laterally-spaced metallic straps 24, which straps constitute a supplemental drag-bar which is detachably pivoted to the seed-boot 7, this pivotal connection being preferably afforded by a bolt 26, passed through the forward ends of the straps 24 and through the rearwardly-projecting end of the straps of the corresponding drag-bar 8. The extreme forward ends of the supplemental drag-bar straps 24 are turned inward to form stops 27, which are adapted to be engaged with the under edges of the straps of the said drag-bar 8, and thereby to limit the downward movement of the presser-wheel 23 with respect to the disk 6, and, conversely, the upward movement of said disk with respect to said presser-wheel.

The presser-wheel 23 is yieldingly drawn downward by a spring attached to the lower portion of the seed-boot 7 and to the intermediate portion of the supplemental guide-bar 24, and to increase the distance between the two points of attachment the straps of the said supplemental drag-bar are bent upward at their intermediate portions, as shown in Fig. 1. A sleeve 28 is journaled between and pivoted to the elbow portions of the straps 24 by means of a transverse bolt 29 passed therethrough. At its central portion this sleeve 28 is formed with a slotted guide $28^a$, through which is passed a stub-bar 30, having perforations through one or the other of which the bolt 29 is passed. To the lower end of this bar 30 is attached the upper end of a coiled spring 31, the lower end of which spring is attached to a perforated lug 32 on the lower rear portion of the seed-boot 7. This spring 31 draws the presser-wheel 23 onto the ground, and gravity of course assists in this action. By adjustments of the perforated stub-bar 30 the tension of the spring 31 may be varied. It will thus be seen that the presser-wheel 23 is yieldingly pressed against the ground under a force which is independent of the yielding force applied to the disk 6 by the spring 19. The spring 19 must of course be much stronger than the spring 31. By the above-described arrangement the presser-wheel 23 is brought close up to the coöperating disk 6 and is yieldingly drawn down to its work by a spring which is so disposed that it is capable of a very considerable movement and the tension of which is variable independently of the tension of the spring 19.

By removing the bolt 26 and by unhooking the lower end of the spring 31 from the lug 32 the presser-wheel attachment may be quickly removed from working position, and an ordinary covering-chain may then be attached to the said lug 32 for operation in the usual way. It is of course understood that some conditions of the soil require packing after seeding, while others simply require loose covering. The device described makes the machine easily convertible to meet either of these conditions.

As is evident, when the boot 7 is raised into an inoperative position by the lever 13 and intermediate connections the stops 27 on the forward ends of the drag-bar straps 24 will engage the rear ends of the straps of the drag-bar 8 and cause the presser-wheel 23 also to be raised into an inoperative position above the ground.

From what has been said it will be understood that the device described is capable of modification within the scope of my invention as herein set forth and claimed.

What I claim, and desire to secure by Letters Patent of the United States, is as follows:

1. In a machine of the character described, the combination with seed-boots having a furrow-opening disks and having drag-bars pivoted to the forward portion of the machine-frame, of yielding pressure devices, operating on said boots and serving to raise and lower the same presser-wheels, presser-wheel drag-bars pivoted to said boots, sleeves applied to the intermediate portions of said presser-wheel drag-bars, stud-bars adjustably secured to said sleeves, and tension-springs connecting the lower ends of said stud-bars to the lower portions of the respective boots, substantially as described.

2. In a machine of the character described, the combination with seed-boots having furrow-opening disks, and having drag-bars pivoted to the forward portion of the machine-frame, of yielding pressure devices operating on said boots and involving means for raising the same, presser-wheels, presser-wheel drag-bars pivoted to said boots and made up each of pairs of laterally-spaced metallic straps, bent upward at their intermediate portions, and provided at their forward ends, with stops engageable with parts rigid on said seed-boots, sleeves secured between and to the intermediate upwardly-bent portions of said straps, stub-bars adjustably secured to said sleeves, and springs connecting the lower ends of said stub-bars to the lower portion of said seed-boots, substantially as described.

In testimony whereof I affix my signature in presence of two witnesses.

THOMAS BRENNAN, Jr.

Witnesses:
E. R. BEEMAN,
LOUIS W. FULLER.